United States Patent [19]

Okumura et al.

[11] Patent Number: 5,706,102

[45] Date of Patent: Jan. 6, 1998

[54] DATA MANAGING DEVICE IN IMAGE VARIABLE MAGNIFICATION PROCESSING APPARATUS

[75] Inventors: Takuji Okumura; Hideo Azumai; Satoshi Iwatsubo, all of Osaka, Japan

[73] Assignee: Mita Industrial Co., Ltd., Osaka, Japan

[21] Appl. No.: 400,814

[22] Filed: Mar. 8, 1995

[30] Foreign Application Priority Data

Mar. 15, 1994 [JP] Japan .................................. 6-044155

[51] Int. Cl.⁶ ............................................ H04N 1/00
[52] U.S. Cl. .................... 358/404; 358/444; 358/451; 358/462
[58] Field of Search ................... 358/428, 451, 358/452, 455, 456, 462, 467, 470, 404, 444; 382/256, 258, 259

[56] References Cited

U.S. PATENT DOCUMENTS 4,554,593  11/1985  Fox et al. .......................... 358/455
4,725,892   2/1988  Suzuki et al. ...................... 358/451
5,235,436   8/1993  Sakamoto et al. .................. 358/462

*Primary Examiner*—Kim Vu
*Assistant Examiner*—Jerome Grant, II
*Attorney, Agent, or Firm*—Beveridge, DeGrandi, Weilacher & Young, LLP

[57] ABSTRACT

A data managing device according to the present invention processes the same object pixel before and after variable magnification processing, and collectively manages processing data before and after the variable magnification processing by making access to a memory once. In the variable magnification processing before and after which the number of object pixels differs, 1-bit BF data for area separation processing performed before the variable magnification processing and 7-bit produced error data for error diffusion processing performed after the variable magnification processing are mixed, and data composed of a total of 8 bits which is obtained by the mixing is read out/written from and to the same address in a SRAM 4 at the same access timing. Therefore, at the time of reduction processing, a reduction processing control signal SMWAIT is produced, and error diffusion processing is stopped when the signal is at a high level.

4 Claims, 7 Drawing Sheets

DATA MANAGING DEVICE IN IMAGE VARIABLE MAGNIFICATION PROCESSING APPARATUS

BACKGROUND OF THE INVENTION

1. Field of the Invention

The present invention relates to a data managing device at the time of variable magnification processing which is applied to a facsimile, a digital copying machine or the like for enlarging or reducing an output image relative to an input image.

2. Description of the Related Art

When a read document image is enlarged or reduced and the enlarged or reduced document image is outputted in a facsimile, for example, pixels composing the image are overlapped or thinned in the direction of horizontal scanning (the direction of reading by an image sensor).

If such variable magnification processing is performed, the number of object pixels to be processed differs before and after the variable magnification processing.

In an apparatus for representing an image optically read by a binary image, for example, a facsimile, various types of processing occur, such as: shading correction processing for correcting non uniformity of density between pixels which is caused by non uniformity of illumination by a light source in reading a document with respect to the read image; area separation processing for separating a binary image such as a character image and a halftone image such as a picture; and error diffusion processing for binary-coding an object pixel in consideration of not only density data representing the object pixel but also produced error data obtained from predetermined pixels in the vicinity of the object pixel and dispersing an error produced for each pixel (also referred to as "an average error minimum method").

Various types of processing are performed before and after the variable magnification processing, that is, the shading correction processing and the area separation processing, for example, are performed before the variable magnification processing and the error diffusion processing is performed after the variable magnification processing.

Furthermore, in each processing, not only data representing an object pixel to be processed but also data representing a pixel in the vicinity of the object pixel is used. The data representing the pixel in the vicinity of the object pixel is stored in a SRAM (Static Random Access Memory) or the like. The data representing the pixel in the vicinity of the object pixel which is stored in the SRAM is read out at the time of the processing. If the object pixel is processed to obtain data representing the object pixel, the data representing the object pixel is written into the SRAM as data representing a pixel in the vicinity of the succeeding object pixel.

As described above, the number of object pixels differs before and after the variable magnification processing. Consequently, 1-bit BF data required for the area separation processing, for example, performed before the variable magnification processing (the BF data is 1-bit data indicating which of a character area or a halftone area is an area to which a predetermined pixel belongs, as described later) and 7-bit produced error data required for the error diffusion processing performed after the variable magnification processing have been conventionally respectively written to and read out from different addresses in the SRAM at different access times.

In the conventional apparatus, therefore, the management of the data stored in the SRAM is complicated. Moreover, the data required for the processing performed before the variable magnification processing and the data required for the processing performed after the variable magnification processing are respectively stored at different addresses in the SRAM, whereby the capacity of the SRAM must be large.

SUMMARY OF THE INVENTION

Therefore, an object of the present invention is to provide a data managing device capable of writing and reading out processing data required for respective types of processing performed before and after variable magnification processing to and from the same address in a temporary memory such as an SRAM at the same access timing.

In accordance with an aspect, the present invention provides a data managing device in an image variable magnification processing apparatus which is characterized by comprising variable magnification processing means for enlarging or reducing an image composed of a plurality of pixels by overlapping or thinning the pixels, first processing means provided in the preceding stage of the variable magnification processing means for taking the pixels composing the image before the variable magnification processing as object pixels in order and subjecting each of the object pixels to first processing on the basis of first processing data related to a predetermined pixel in the vicinity of the object pixel, second processing means provided in the succeeding stage of the variable magnification processing means for taking the pixels composing the image after the variable magnification processing as object pixels in order and subjecting each of the object pixels to second processing on the basis of second processing data related to a predetermined pixel in the vicinity of the object pixel, temporarily storing means for temporarily storing the first processing data and the second processing data, and data managing means for writing or reading out the first processing data required to process the object pixel in the first processing means and the second processing data required to process the object pixel in the second processing means to and from the same address in the temporarily storing means at the access timing which is synchronized with the overlapping or thinning of the pixels by the variable magnification processing means.

In accordance with another aspect, the present invention provides a data managing device in an image variable magnification processing apparatus which is characterized in that the first processing means is area separating means for taking pixels composing an image in which a character image and a halftone image are present as a mixture as object pixels in order and judging which of the character area and the halftone area is an area to which the object pixel belongs in consideration of BF data indicating which of the character area and the halftone area is an area to which a predetermined pixel in the vicinity of the object pixel belongs, the first processing data is the BF data, the second processing means is error diffusing means for adding, if pixels represented by multi-valued density data are identified as black or white pixels in order, produced error data distributed from a plurality of predetermined pixels in the vicinity of each of the object pixels to be identified as black or white pixels to density data representing the object pixel and comparing the result of the addition with a predetermined binary-coding threshold value, thereby to binary-code the object pixel, and the second processing data is the produced error data.

According to the present invention, the first processing data such as the BF data required for the first processing, for example, the area separation processing performed before the variable magnification processing and the second processing data such as the produced error data required for the second processing, for example, the error diffusion processing performed after the variable magnification processing are mixed, and data obtained by the mixing is written to and read out from the same address in the temporarily storing means at the access timing which is synchronized with the overlapping or thinning of the pixels by the variable magnification processing.

The timing of access to the temporarily storing means is thus synchronized with the change in the number of pixels by processing in the variable magnification processing means, thereby to make it possible to collectively manage the processing data required for the respective types of processing before and after the variable magnification processing even if the number of pixels to be processed differs before and after the variable magnification processing.

According to the present invention, if data required for the respective types of processing performed before and after the variable magnification processing are managed using the temporary memory such as a SRAM, the data can be managed at the same access timing with respect to the same address. Therefore, it is possible to reduce the capacity of the temporary memory such as an SRAM as well as manage a plurality of processing data by one address managing circuit.

Particularly, data management which cannot be conventionally achieved because the number of pixels to be processed differs before and after the variable magnification processing by the variable magnification processing can be achieved at the same timing of management even if the number of pixels to be processed varies.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
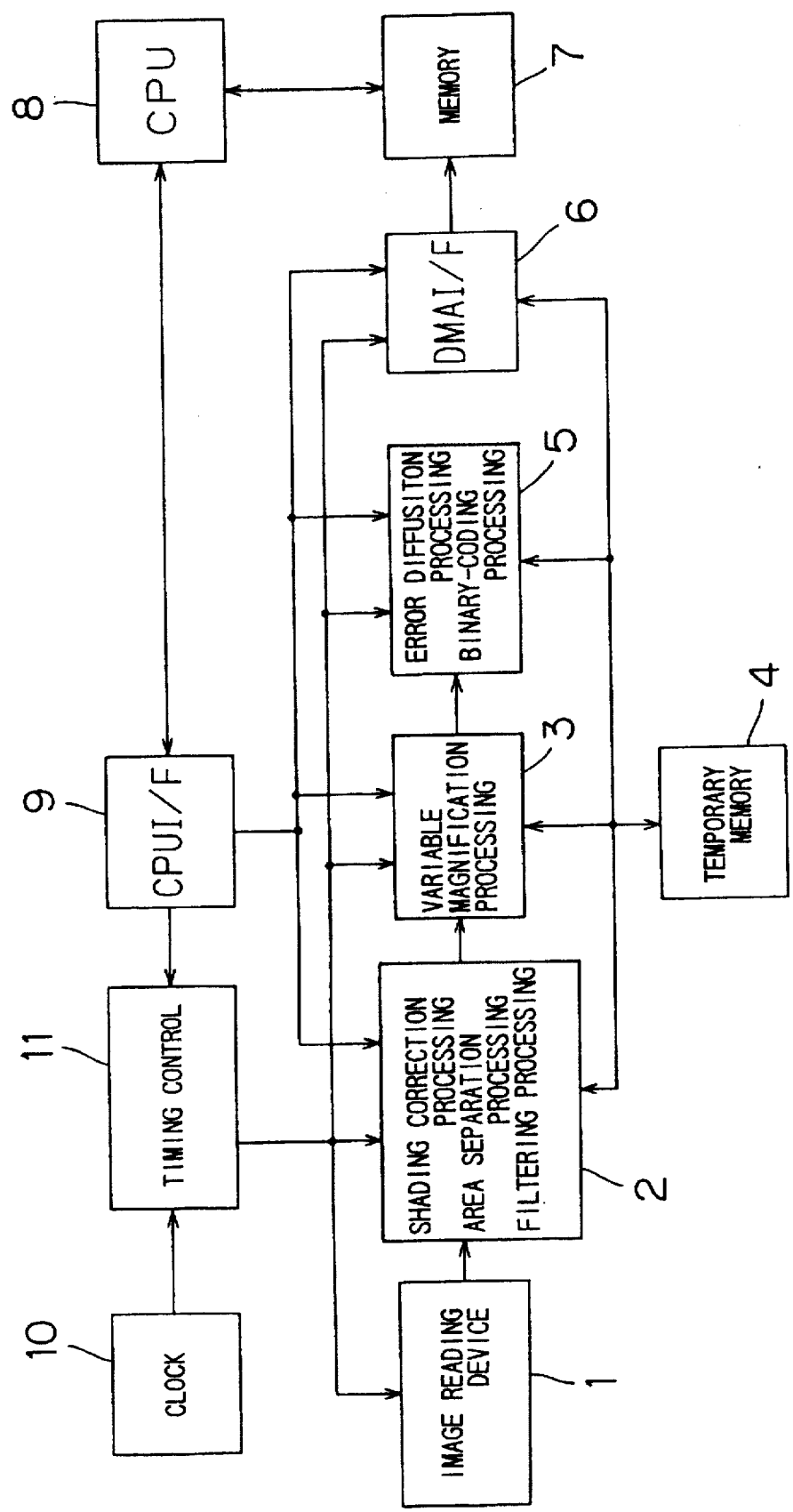
FIG. 1 is a block diagram showing the schematic construction of an image reading processing portion in a facsimile to which a data managing circuit in variable magnification processing according to one embodiment of the present invention is applied.

FIG. 1 is a block diagram showing the construction of an image reading processing portion of a digital facsimile to which one embodiment of the present invention is applied.

Referring to FIG. 1, the facsimile comprises an image reading device 1 for reading a document image. The image reading device 1 comprises a line sensor, moving means for changing the relative positional relationship between the line sensor and the document to be read in a direction orthogonal to the direction for reading by the line sensor, an analog-to-digital converter circuit for converting analog image data read by the line sensor into digital image data, and the like, which are not illustrated. The image reading device 1 itself has been already known.

The digital image data outputted from the image reading device 1 is applied to a first image processing circuit 2. In the first image processing circuit 2, shading correction processing, area separation processing and filtering processing, for example, are performed.

The shading correction processing is processing for reducing or removing non uniformity of density between pixels which is caused by non uniformity of illumination by a light source for reading when the image data is read by the image reading device 1.

The area separation processing is processing for taking, when image data optically read by the image reading device 1 is image data in which character image data as binary density data such as a character and halftone image data such as a picture are present as a mixture, pixels composing the image data as object pixels in order, judging which of a character area and a halftone area is an area to which the object pixel belongs, and separating the character image data and the halftone image data.

The filtering processing is processing for respectively passing the character data and the halftone data which are separated by the area separation processing through filters suitable for the characteristics of the respective data. The character data is generally passed through a differential filter, so that the boundary between a white pixel and a black pixel is made clear to emphasize the contour of the character data. On the other hand, the halftone data is passed through a circuit which is subjected to no processing such as a path through filter. In other words, the halftone data is not subjected to particular processing.

The image data which is subjected to the shading correction processing, the area separation processing and the filtering processing in the first image processing circuit 2 is applied to a variable magnification processing circuit 3. In the variable magnification processing circuit 3, the image data is subjected to enlargement or reduction processing as required. In the enlargement of the image data, the pixels are overlapped at a predetermined ratio in the direction of horizontal scanning (the direction of reading by an image sensor), while line data are overlapped at a predetermined ratio in the direction of vertical scanning. On the other hand, if the image data is reduced, the pixels are thinned at a predetermined ratio in the direction of horizontal scanning, while line data are thinned at a predetermined ratio in the direction of vertical scanning.

At the time of the variable magnification processing, it is preferable that smoothing processing is simultaneously performed so that the change in density between the pixels becomes smooth in image data which is subjected to variable magnification processing.

The data which is subjected to the variable magnification processing in the variable magnification processing circuit 3 is applied to a second image processing circuit 5. In the second image processing circuit 5, error diffusion processing and binary-coding processing, for example, are performed.

The error diffusion processing is processing for adding, if pixels represented by multivalued density data are identified as black or white pixels in order as object pixels, produced error data produced at the time of the identification which is distributed from a plurality of predetermined pixels in the vicinity of each of the object pixels to density data representing the object pixel.

The binary-coding processing is processing for comparing the result obtained by adding the produced error data to the density data representing the object pixel with a predetermined binary-coding threshold value to binary-code the object pixel, as its name indicates.

Although description is made of the error diffusion processing and the binary-coding processing as different types of processing, they may be referred to as error diffusion processing.

The image data which has been processed in the second image processing circuit 5 is stored in a line data storage area in the temporary memory 4 which is constituted by an SRAM, for example, for each line. The stored data is transferred to an image memory 7 such as a frame memory by DMA transfer through a DMA interface 6.

The data in the image memory 7 is read out by a CPU (Central Processing Unit) 8, is sent to an image data transmitting circuit or the like (not shown), is coded for transmission, and is transmitted to a predetermined destination of transmission.

The facsimile further comprises a timing control circuit 11 for applying a timing clock or a predetermined signal to each of the image reading device 1, the first image processing circuit 2, the variable magnification processing circuit 3, the second image processing circuit 5, the DMA interface 6 and the like so as to obtain matching of the operation timings in the respective portions. In the timing control circuit 11, the timing clock or the predetermined signal is produced on the basis of a reference clock from a clock generating circuit 10.

Furthermore, the entire operation of the facsimile is controlled by the above described CPU 8. Specifically, the CPU 8 controls the timing control circuit 11, the first image processing circuit 2, the variable magnification processing circuit 3, the second image processing circuit 5, and the DMA interface 6 through a CPU interface 9.

In the area separation processing performed in the first image processing circuit 2, 1-bit BF data indicating which of a character area and a halftone area is an area to which a predetermined pixel in the vicinity of an object pixel belongs is used in judging which of the character area and the halftone area is an area to which the object pixel belongs. This BF data is stored in the temporary memory 4 which is constituted by a SRAM, for example, as described later.

Furthermore, in the error diffusion processing performed by the second image processing circuit 5 after the variable magnification processing, 7-bit produced error data is distributed from a plurality of predetermined pixels in the vicinity of the object pixel and is added to density data representing the object pixel. The produced error data distributed in the object pixel is stored in the temporary memory (SRAM) 4, as described later.

The embodiment is characterized in that the 1-bit BF data and the 7-bit produced error data respectively required for the area separation processing and the error diffusion processing which are performed before and after the variable magnification processing are mixed, and data composed of a total of 8 bits which is obtained by the mixing is read out from and written to the same address in the temporary memory (SRAM) 4 at the same access timing.

Figure 2:
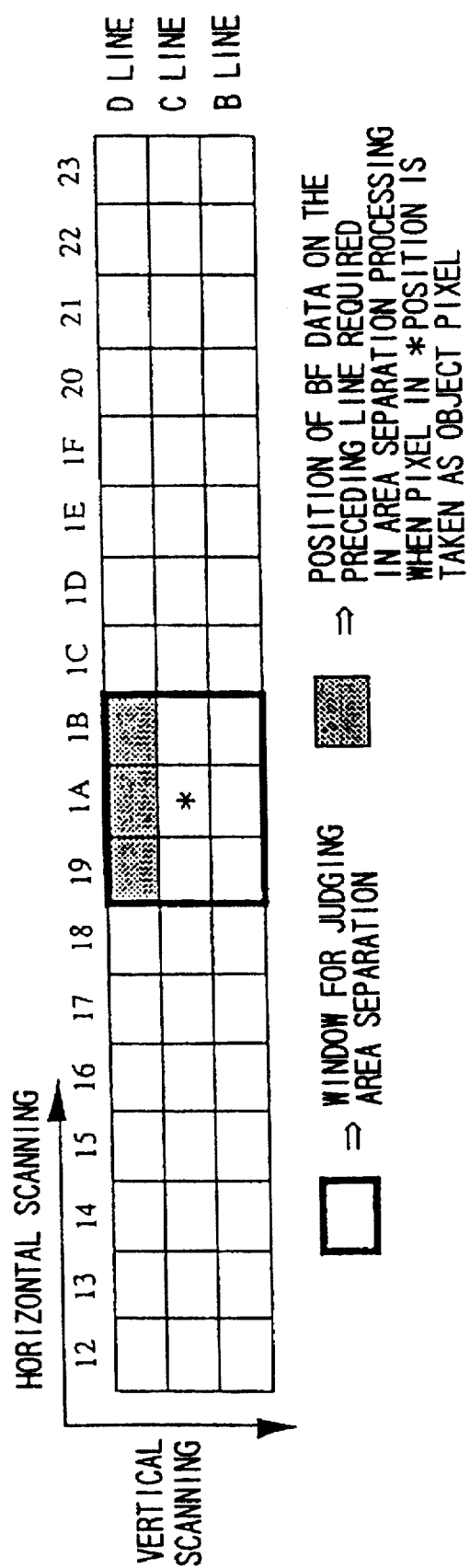
FIG. 2 is an illustration showing the positional relationship between BF data for area separation processing and an object pixel.

FIG. 2 illustrates the positional relationship between the 1-bit BF data required for the area separation performed before the variable magnification processing and an object pixel.

Suppose data on D, C and B lines are sequentially applied, and a pixel in a position 1A on the C line is an object pixel (a pixel *) which is to be subjected to the area separation processing. At this time, a 3×3 area enclosed by a thick frame is a window for judging area separation, and BF data in positions "19", "1A" and "1B" on the preceding line (the D line) are required to judge area separation of the object pixel *.

The BF data on the D line is stored in the temporary memory (SRAM) 4. If the BF data on the D line is read out, after which BF data on the C line which is a line including the object pixel is obtained, the BF data on the C line is written into the temporary memory (SRAM) 4 in place of the BF data on the D line. The operation is performed for each pixel. For example, the BF data in the position "1B" on the D line is read out, after which BF data in the position "1B" on the C line is written into the same address. The BF data corresponding to nine pixels in the window for judging area separation are held by a shift register at the time of processing.

Figure 3:
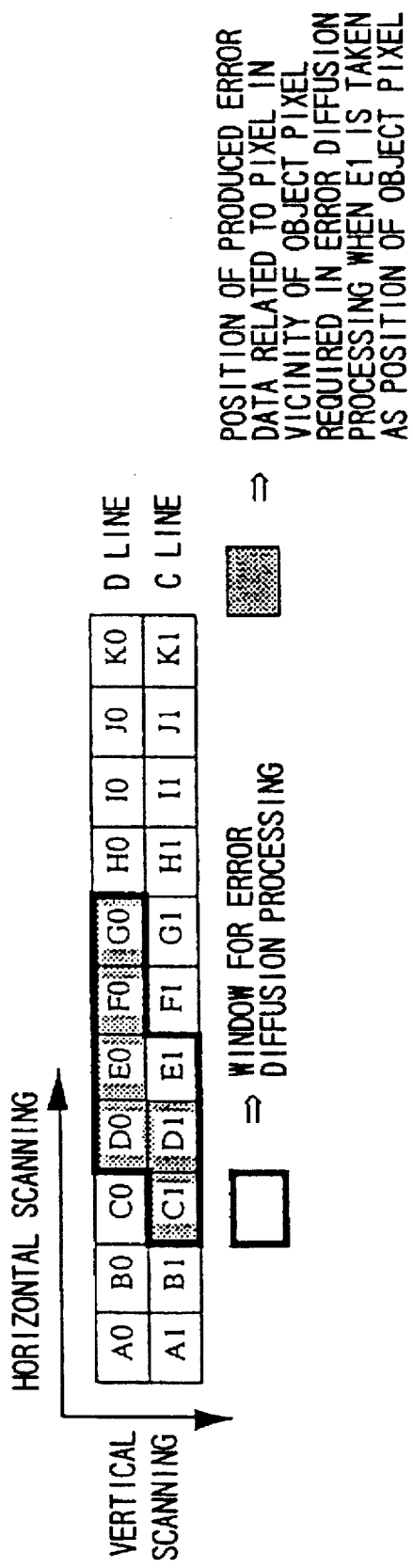
FIG. 3 is an illustration showing the positional relationship between produced error data for error diffusion processing and an object pixel.

FIG. 3 illustrates the positional relationship between the produced error data required in the error diffusion processing performed after the variable magnification processing and an object pixel. In FIG. 3, an area composed of a total of 7 pixels comprising four pixels on the D line and three pixels on the C line which are enclosed by a thick frame is a window for error diffusion processing.

When "E1" on the C line is taken as an object pixel, produced error data related to pixels in the vicinity of the object pixel which are required in performing the error diffusion processing of the object pixel are produced error data in positions "D0", "E0", "F0" and "G0" on the D line which is the preceding line and positions "C1" and "D1" on the C line. The produced error data on the D line out of the produced error data are stored in the temporary memory (SRAM) 4.

If the produced error data on the D line are read out from the temporary memory (SRAM) 4, after which the produced error data on the C line including the object pixel "E1" are found, the produced error data on the C line are written into addresses storing the produced error data on the D line. The operation is performed for each pixel. For example, the produced error data in the position "G0" on the D line is read out, after which produced error data in a position "G1" on the C line is written into the same address. Each of the produced error data in the window for error diffusion processing is held by the shift register.

The area separation processing and the error diffusion processing are performed before and after the variable magnification processing. If the variable magnification processing is performed, the number of pixels is increased or decreased. Therefore, the number of pixels to be processed differs before and after the variable magnification processing. Specifically, if the enlargement processing is performed, "the number of pixels to be subjected to area separation processing"<"the number of pixels to be subjected to error diffusion processing". On the contrary, if the reduction processing is performed, "the number of pixels to be subjected to area separation processing">"the number of pixels to be subjected to error diffusion processing".

Furthermore, in the error diffusion processing, the position of the object pixel "E1" and the position "G0" where the produced error data on the D line is read out are not the same position in the direction of horizontal scanning, as shown in FIG. 3. The position where the produced error data on the D line is read out is a position two pixels ahead of the position of the object pixel in the direction of horizontal scanning.

The present embodiment makes it possible to collectively manage the 1-bit BF data for area separation processing and the 7-bit produced error data for error diffusion processing by a data managing circuit provided in the variable magnification processing circuit 3 under the foregoing conditions.

Figure 4:
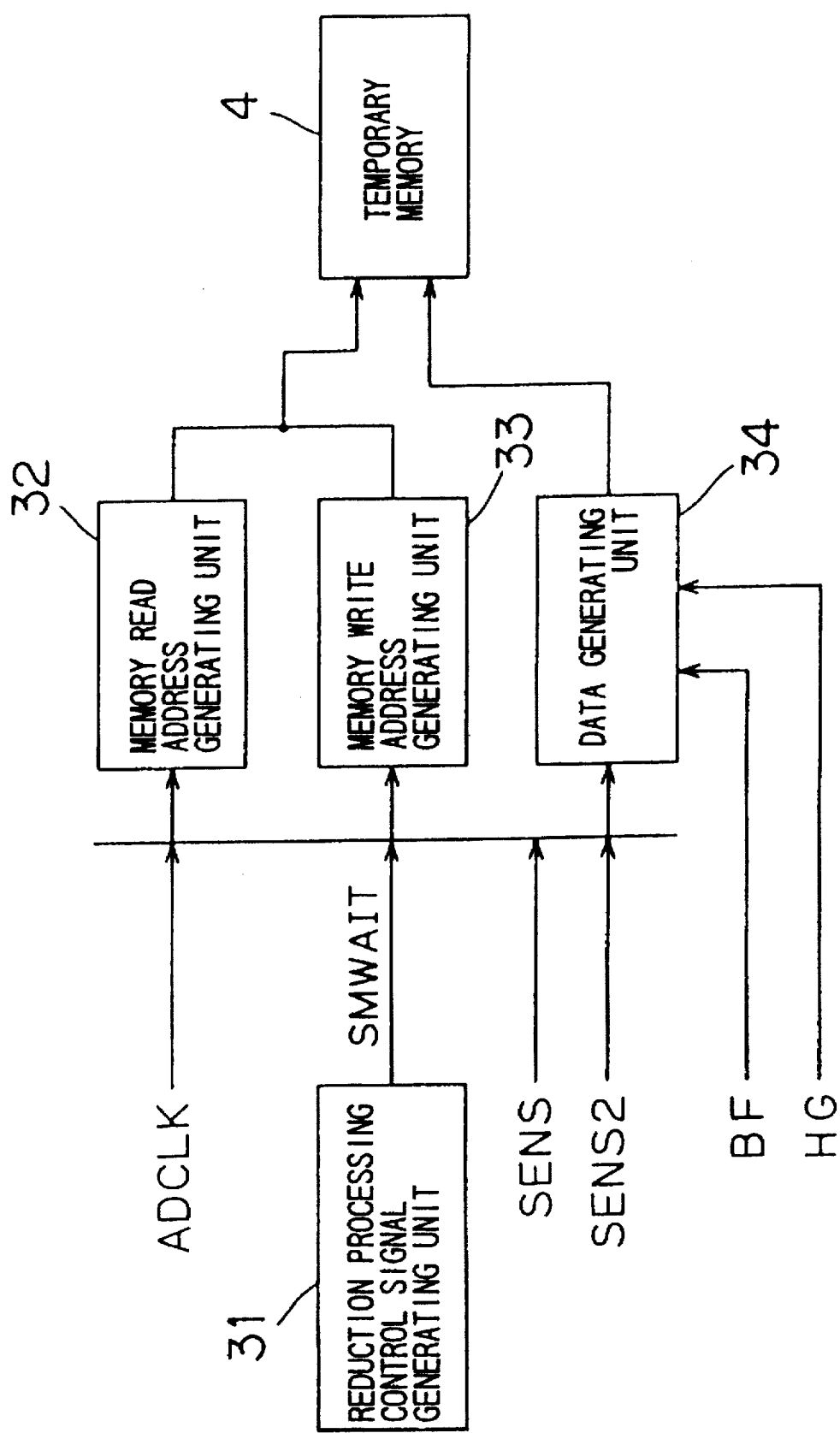
FIG. 4 is a block diagram showing a data managing circuit in a variable magnification processing circuit according to one embodiment of the present invention.

FIG. 4 is a block diagram showing the schematic construction of the data managing circuit in the variable processing circuit 3. The data managing circuit comprises a reduction processing control signal generating unit 31, and a reduction processing control signal SMWAIT is outputted from the generating unit 31. In addition, a pixel management clock ADCLK, an effective image section signal SENS and an image processing section SENS2 are applied from the timing control circuit 11 shown in FIG. 1.

The data managing circuit further comprises a memory read address generating unit 32 and a memory write address generating unit 33. An address in the temporary memory (SRAM) 4 is specified by an address generated by each of the address generating units 32 and 33.

The data managing circuit further comprises a data generating unit 34. 1-bit BF data BF and 7-bit produced error data HG are applied to the data generating unit 34. The data generating unit 34 mixes the BF data and the produced error data to generate 8-bit data. The generated 8-bit data is written into the address generated by the memory write address generating unit 33 in the temporary memory (SRAM) 4. Further, data at the address generated by the memory read address generating unit 32 is read out.

Figure 5:
FIG. 5 is a diagram showing the timing of access to a memory at the time of reduction by the data managing circuit according to one embodiment of the present invention.

FIG. 5 is a timing chart of the timing of access to a memory for explaining a managing operation of the data managing circuit shown in FIG. 4. The timing shown in FIG. 5 is the timing in a case where the reduction processing is performed.

Referring to FIG. 5, processing time of one pixel is represented by STATE. Suppose read/write operations are respectively performed once from/to the temporary memory (SRAM) 4 within one STATE. A reduction processing control signal SMWAIT is a signal for indicating whether or not error diffusion processing is to be performed. The processing is performed when the reduction processing control signal SMWAIT is at a low level, while being stopped when it is at a high level. In FIG. 5, there is STATE during which the reduction processing control signal SMWAIT is at a high level. This indicates that at the time of error diffusion processing, reduction processing in which the error diffusion processing must be stopped, that is, the number of object pixels is smaller than that before the variable magnification processing is performed.

Furthermore, an address and data in the temporary memory (SRAM) 4 are determined by the state of the reduction processing control signal SMWAIT.

In FIG. 5, the number of pixels to be subjected to area separation processing is larger than the number of pixels to be subjected to error diffusion processing, whereby the respective positions of the object pixels are not always the same. For example, in STATE "1B" shown in FIG. 5, the BF data in the position "1B" on the D line which is a read line is read out, whereby the area separation processing is performed with respect to the pixel in the position "1A" on the C line, as shown in FIG. 2.

On the other hand, in error diffusion processing, the produced error data in the position "G0" on the D line which is a read line is read out, whereby the error diffusion processing is performed by taking the pixel in the position "E1" on the C line as an object pixel to find produced error data, as shown in FIG. 3.

The address is the same in value as the number of STATE irrespective of the reduction processing control signal SMWAIT as an operation at the time of reading, and is incremented one at a time. Signs in the column of the BF data and the column of the produced error data refer to the respective positions of data read out. A sign X in the column of the produced error data indicates that the error diffusion processing is stopped when the reduction processing control signal SMWAIT is at a high level. In this case, the shift register holding the produced error data in the window for error diffusion processing is not shifted, to maintain the preceding state.

An operation at the time of writing is started at a value obtained by subtracting two from the number of STATE as a start address. The reason for this is that if produced error data on the preceding line is read out of the temporary memory (SRAM) 4, the position for the reading is a position two pixels ahead of the position of an object pixel in the error diffusion processing, as described above.

At the time of writing, the address represents the number of STATE when the reduction processing control signal SMWAIT is at a high level, while being the number of STATE two ahead of the number of STATE during which the reduction processing control signal SMWAIT is at a low level when the reduction processing control signal SMWAIT is at a low level. At this time, the position where the BF data and the produced error data are written into the temporary memory (SRAM) 4 is the same as that in an address operation.

Figure 6:
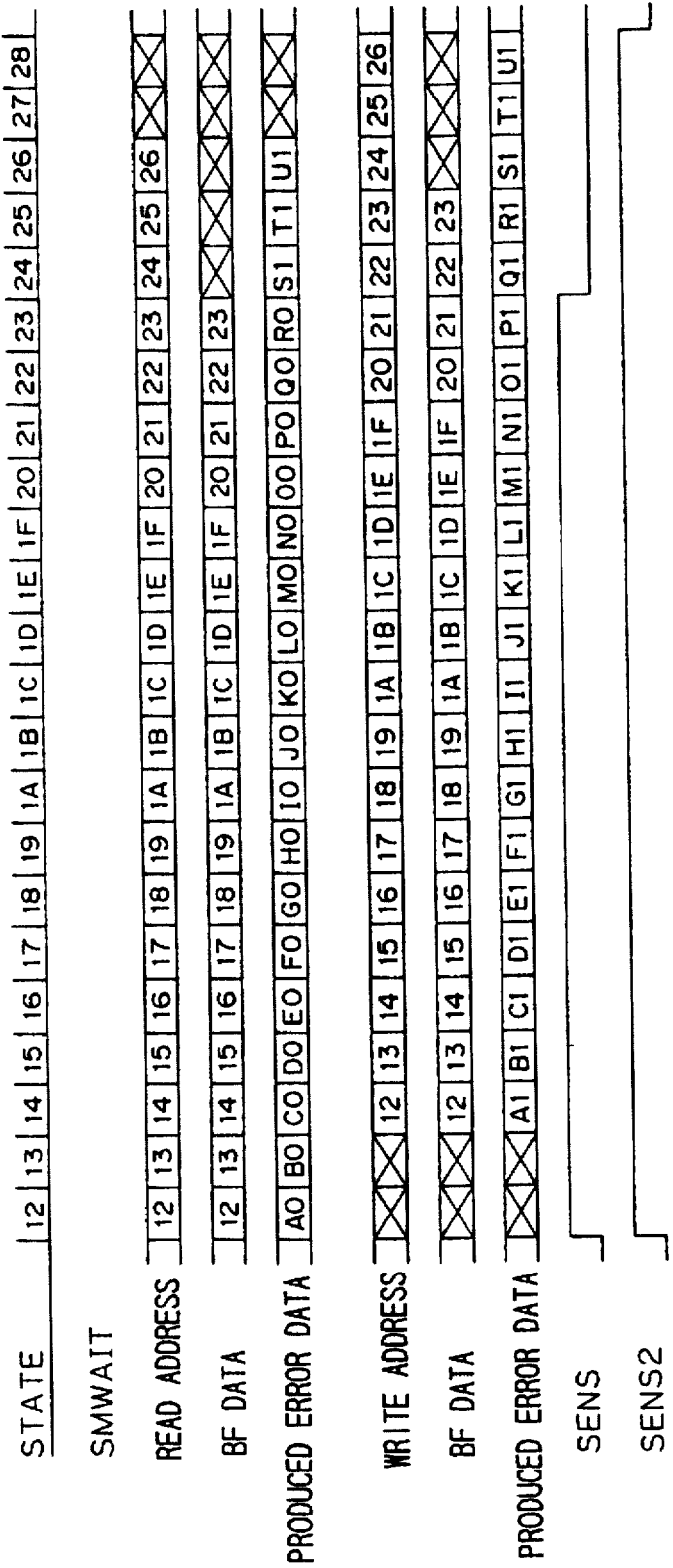
FIG. 6 is a diagram showing the timing of access to a memory at the time of enlargement by the data managing circuit according to one embodiment of the present invention.

On the other hand, FIG. 6 is a timing chart showing the timing of access to a memory in a case where enlargement processing is performed in the variable magnification processing circuit 3 (see FIG. 1). If the enlargement processing is performed, the number of object pixels to be subjected to error diffusion processing is made larger than the number of pixels to be subjected to area separation processing. In this case, therefore, the reduction processing control signal SMWAIT is always at a low level, whereby the error diffusion processing is not stopped.

In the access to a memory at the time of the enlargement, the image processing section SENS2 extends, to increase the produced error data. Since the BF data corresponds to pixels whose number is only the number of pixels before the enlargement, therefore, the BF data corresponding to pixels whose number exceeds the number of pixels before the enlargement is made ineffective.

Figure 7:
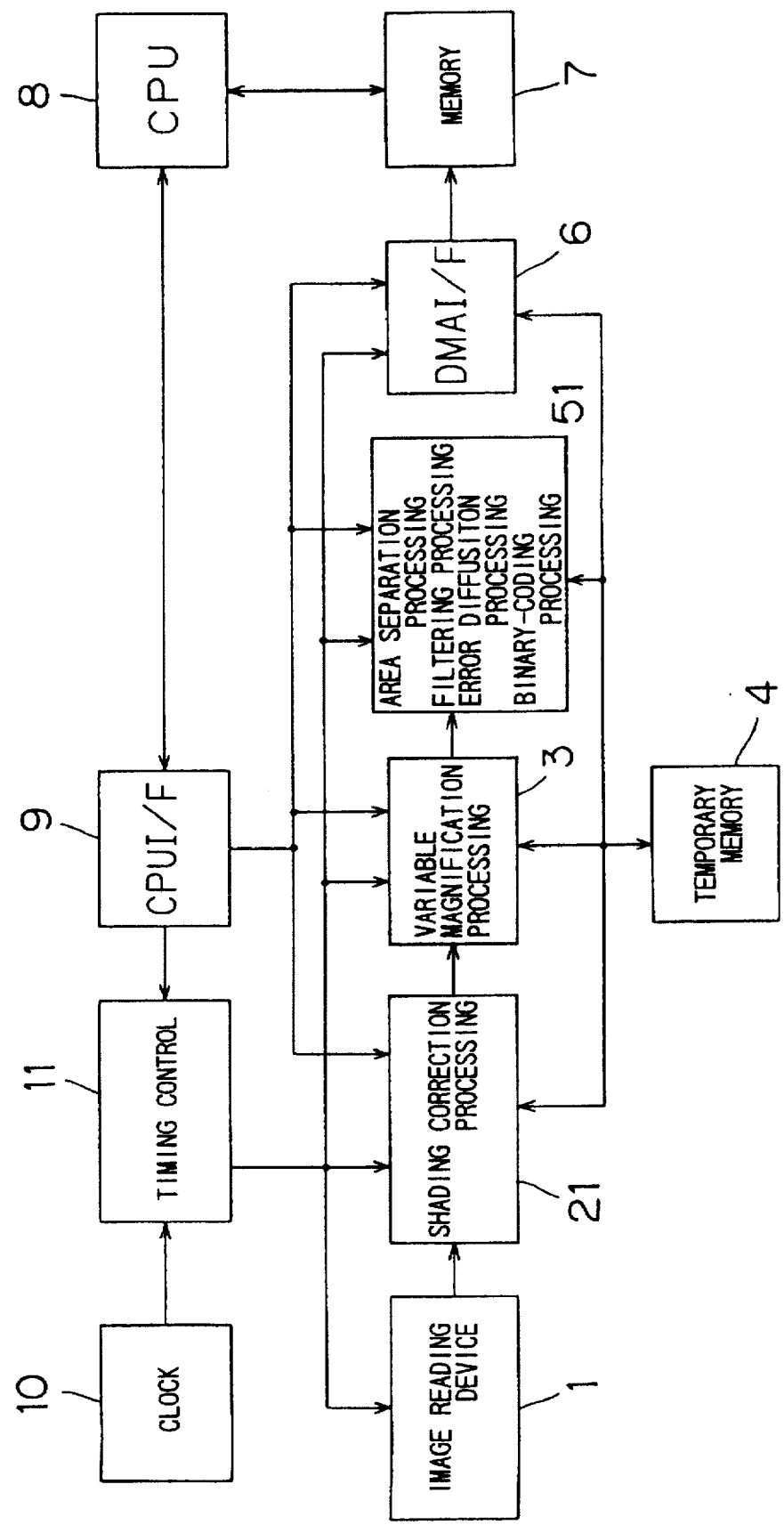
FIG. 7 is a block diagram showing the schematic construction of an image reading processing portion in a facsimile comprising a data managing circuit according to another embodiment of the present invention.

FIG. 7 is a block diagram showing the schematic construction of an image reading portion of a facsimile to which a data managing circuit according to another embodiment of the present invention is applied.

The data managing circuit shown in FIG. 7 is characterized in that a first image processing circuit 21 provided in the preceding stage of a variable magnification processing circuit 3 is a circuit for performing shading correction processing, and a second image processing circuit 51 provided in the succeeding stage of the variable magnification processing circuit 3 is a circuit for performing area separation processing, filtering processing, error diffusion processing and binary-coding processing. If a data managing circuit for managing data at the timing which is synchronized with the timing of the variable magnification processing is used even in a case where the shading correction processing and the area separation processing are performed before and after the variable magnification processing, data respectively required for the shading correction processing and the area separation processing can be managed at the same address as that in a temporary memory (SRAM) 4 and at the same access timing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data managing device in an image variable magnification processing apparatus, comprising:

variable magnification processing means for enlarging or reducing an image composed of a plurality of pixels by overlapping or thinning the pixels;

first processing means provided in a preceding stage of said variable magnification processing means for taking the pixels composing the image before variable magnification processing as object pixels in order and subjecting each of the object pixels to first processing on the basis of first processing data related to a predetermined pixel in the vicinity of the object pixel;

second processing means provided in a succeeding stage of said variable magnification processing means for taking the pixels composing the image after the variable magnification processing as object pixels in order and subjecting each of the object pixels to second processing on the basis of second processing data related to a predetermined pixel in the vicinity of the object pixel;

temporarily storing means for temporarily storing said first processing data and said second processing data; and data managing means for writing the first processing data required to process the object pixel in said first processing means and the second processing data required to process the object pixel in said second processing means to an address in said temporarily storing means at a same access time as reading out first processing data and second processing data from said address, said access time being synchronized with the overlapping or thinning of the pixels by said variable magnification processing means.

2. The data managing device in an image variable magnification processing apparatus according to claim 1, wherein said first processing means is area separating means for taking pixels composing an image in which a character image, and a halftone image are present as a mixture, as object pixels in order and judging which of the character area and the halftone area is an area to which the object pixel belongs in consideration of BF data indicating which of the character area and the halftone area is an area to which a predetermined pixel in the vicinity of said object pixel belongs, said first processing data is the BF data, said second processing means is error diffusing means for adding, if pixels represented by multi-valued density data are identified as black or white pixels in order, produced error data distributed from a plurality of predetermined pixels in the vicinity of each of the object pixels to be identified as black or white pixels to density data representing the object pixel and comparing the result of the addition with a predetermined binary-coding threshold value, thereby to binary-code the object pixel, and said second processing data is the produced error data.

3. The data managing device in an image variable magnification processing apparatus, comprising:

variable magnification processing means for enlarging or reducing an image composed of a plurality of pixels by overlapping or thinning the pixels;

first processing means provided in a preceding stage of said variable magnification processing means for taking the pixels composing the image before variable magnification processing as object pixels in order and subjecting each of the object pixels to first processing on the basis of first processing data related to a predetermined pixel in the vicinity of the object pixel;

second processing means provided in a succeeding stage of said variable magnification processing means for taking the pixels composing the image after the variable magnification processing as object pixels in order and subjecting each of the object pixels to second processing on the basis of second processing data related to a predetermined pixel in the vicinity of the object pixel;

temporary storing means for temporarily storing the first processing data and said second processing data; and data managing means for writing or reading out the first processing data required to process the object pixel in said first processing means and the second processing data required to process the object pixel in said second processing means to and from the same address in said temporary storing means at access timing which is synchronized with the overlapping or thinning of the pixels by said variable magnification processing means, wherein said first processing means is area separating means for taking pixels composing an image, in which a character image and a halftone image are present as a mixture, as object pixels in order and judging which of the character area and the halftone area is an area to which the object pixel belongs in consideration of BF data indicating which of the character area and the halftone area is an area to which a predetermined pixel in the vicinity of the object pixel belongs, the first processing data is the BF data, said second processing means is an error diffusing means for adding, if pixels represented by multi-valued density data are identified as black or white pixels in order, produced error data distributed from a plurality of predetermined pixels in the vicinity of each of the object pixels to be identified as black or white pixels to density data representing the object pixel and comparing the result of the addition with a predetermined binary-coding threshold value, thereby to binary-code the object pixel, and the second processing data is the produced error data, and wherein said BF data have a first number of bits, said produced error data have a second number of bits, different from said first number, and said data managing means includes data generating means which receives said BF data and said produced error data and mixes said BF data and said produced error data to generate output data having a third number of bits, different from either said first number or said second number.

4. The data managing device in an image variable magnification processing apparatus according to claim 3, wherein said first number of bits is 1 bit,
said second number of bits is 7 bits, and
said third number of bits is 8 bits.

* * * * *